United States Patent [19]

Pocock et al.

[11] Patent Number: 4,937,877
[45] Date of Patent: Jun. 26, 1990

[54] MODULAR MICROPHONE ASSEMBLY

[75] Inventors: Mark W. Pocock; Bradley P. Basnett, both of Ottawa; Michael K. Eldershaw, Nepean; Peter Fatovic, Ottawa; Jacques Gagnon, Kanata; Nahum Goldmann, Nepean; Conrad D. Lafrance, Aylmer; Anthony J. Langenberg, Kanata; W. John McKeen, Ottawa, all of Canada

[73] Assignee: Northern Telecom Limited, Montreal, Canada

[21] Appl. No.: 244,155

[22] Filed: Sep. 14, 1988

[30] Foreign Application Priority Data

Feb. 26, 1988 [CA] Canada ................................. 559950

[51] Int. Cl.5 .................. H04M 1/04; H04M 1/02
[52] U.S. Cl. ................................... 381/158; 381/155; 381/160; 381/169; 379/420; 379/432
[58] Field of Search ............... 381/158, 160, 168, 169, 381/155; 379/420, 433, 419, 432

[56] References Cited

U.S. PATENT DOCUMENTS

| 3,653,625 | 4/1972 | Plice | 381/169 |
| 3,947,646 | 3/1976 | Saito | 381/169 |
| 4,463,222 | 7/1984 | Poradowski | 381/155 |
| 4,528,426 | 7/1985 | Fatovic et al. | 381/155 |
| 4,817,164 | 3/1989 | Bertignoll et al. | 381/169 |

FOREIGN PATENT DOCUMENTS

| 53-92119 | 8/1978 | Japan | 381/155 |
| 53-92120 | 8/1978 | Japan | 381/155 |
| 53-92121 | 8/1978 | Japan | 381/169 |
| 58-44891 | 3/1983 | Japan | 381/155 |
| 59-126355 | 7/1984 | Japan | 379/420 |
| 473515 | 7/1969 | Switzerland | 381/155 |

Primary Examiner—Jin F. Ng
Assistant Examiner—Danita R. Byrd
Attorney, Agent, or Firm—Michael M. Sakovich

[57] ABSTRACT

A modular microphone assembly housed in a handsfree telephone apparatus provides an environment that is isolated from a loudspeaker installed within the apparatus and through which environment the directional and frequency response characteristics of a directional microphone capsule contained within a closable cavity of a microphone mounting receptacle in the assembly are altered via a predetermined internal surface configuration of the receptacle to improve the performance of the apparatus.

20 Claims, 5 Drawing Sheets

MODULAR MICROPHONE ASSEMBLY

FIELD OF THE INVENTION

This invention relates to a modular microphone assembly in which preferred directional and frequency response characteristics are achieved by the structural configuration of the assembly.

BACKGROUND OF THE INVENTION

Microphones used in handsfree telephone apparatus commonly utilize an omnidirectional microphone capsule in an assembly which, when installed in the apparatus, provides a relatively omnidirectional response characteristic. Such a microphone assembly is readily integrated into the apparatus since only a single small opening through a housing of the apparatus will provide effective acoustic coupling from the exterior of the housing to the capsule installed therein. These microphones, however, are invariably afflicted with an unnatural "barrel" or hollow sound resulting from acoustic reflections and room reverberation as well as a bothersome background noise sensitivity common to most handsfree telephone apparatus.

The more common problems of acoustic and mechanical coupling between the microphone of a handsfree telephone apparatus and its immediate environment are described briefly in U.S. Pat. No. 4,528,426 Fatovic et al which issued July 9, 1985. A solution is disclosed therein whereby adverse effects from the reflecting surfaces of the apparatus housing enclosing the microphone are minimized so that desired directional properties of the microphone may be retained. According to Fatovic et al, the microphone is isolated from the housing by being mounted within an acoustic foam covering. This minimizes the effects of the microphone housing on the directional characteristics of the microphone capsule, whereas mechanical vibration damping is provided by the resilient nature of the foam covering.

It has been determined, however, that the use of foam as an isolating material may not resolve the difficulties of the prior art and under certain circumstances may even exacerbate existing problems and add new ones. For example, if the resonant frequency of the microphone capsule/foam assembly is too high, meaning that it is within the range of from 300 Hz to 3 kHz, hereinafter referred to as the "voice band", then the vibration isolation performance is actually worse than it would be in the absence of any resilient suspension.

Other problems attributable to the use of foam for mounting a directional microphone within a handsfree telephone apparatus relate to quality control In this regard, it has been determined that manufacturing tolerance variations in the foam result in a substantial performance variation, notably in the directional characteristics of the microphone assembly Moreover, it has been found that the physical characteristics of the foam do not lend themselves well to high-volume, quality manufacturing in both manual and robotic environments This latter consideration bears, of course, directly on the cost effectiveness of manufacturing handsfree telephone apparatus, the achievement of which is desirable and necessary in either of such manufacturing environments.

SUMMARY OF THE INVENTION

A principal objective of the present invention is to provide a modular microphone assembly that includes a directional microphone capsule mounted within a cavity of a receptacle having a predetermined configuration which imparts specific frequency response and directional characteristics to the assembly.

Another provision of the invention is a modular microphone assembly that significantly reduces both the "barrel" or hollow sound commonly found in handsfree telephones and the sensitivity to background noise that characterizes handsfree telephone apparatus of the prior art.

Yet another provision of the invention is a modular microphone assembly which is consistently manufacturable with uniformly reproducible operating characteristics.

Still another provision of the invention is a modular microphone assembly that is manufacturable in a precisely defined configuration well suited to high-volume quality manufacturing in a robotic fabrication environment.

Another provision of the invention is a mounting assembly which reduces vibrational sensitivity of the microphone capsule within the voice band to a level below that of a rigid mount A further provision of the invention is to improve electrostatic discharge (ESD) immunity of the assembly by protecting the microphone capsule from ESD up to a predetermined voltage level.

The problems associated with the prior art may be substantially overcome and the foregoing objectives achieved by recourse to the invention herein disclosed which is a modular microphone assembly for a handsfree telephone apparatus including a microphone capsule having a longitudinal axis and predetermined free-field directional and frequency response characteristics within the voice band. The assembly comprises a receptacle having a cavity open on one side and defined by a pair of upstanding side walls spaced apart in substantially parallel relation, a first reflective surface within the cavity for establishing an acoustic reflective path to the microphone capsule from a first sound source disposed ahead of the assembly, which path is longer than a corresponding direct path from the sound source, and a second reflective surface within the cavity for reflectively aligning with the longitudinal axis the velocity component of a soundfield produced by a second sound source disposed behind the assembly, whereby reflected and direct sound waves from the first sound source effect destructive interference at the microphone capsule at a predetermined lowest frequency occurring above the voice band to prevent loss of high frequency response therewithin, standing waves generated within the cavity are reduced, and the free-field directional characteristics of the microphone capsule are substantially preserved.

INTRODUCTION TO THE DRAWINGS

The invention will now be more particularly described, by way of example, with reference to embodiments thereof shown in the accompanying drawings wherein.

DESCRIPTION OF THE ILLUSTRATED EMBODIMENTS

Having regard to the illustrated embodiments of the invention and the descriptions thereof which follow, it will be observed that certain structural features are common therein: Therefore, in order that continuity of structure may be readily recognized in the various embodiments, like numerals are used to designate like structural features.

Figure 1:
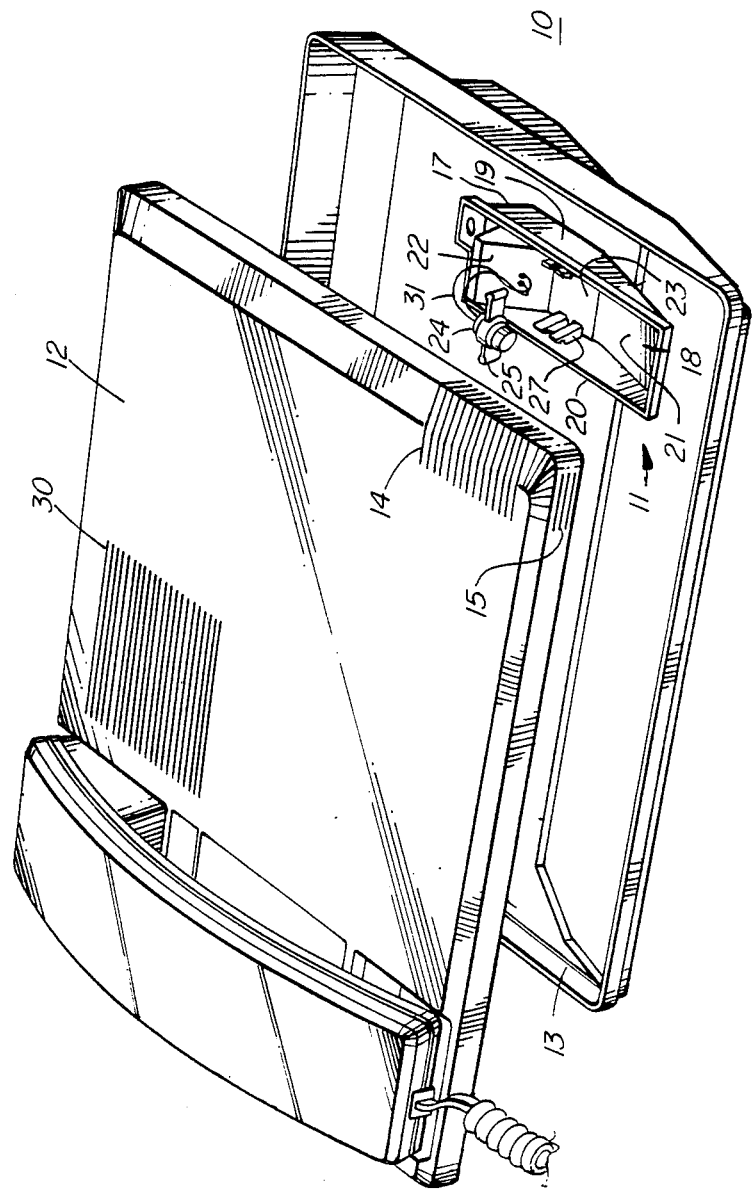
FIG. 1 is a perspective view of an open handsfree telephone apparatus showing the location therein of one embodiment of a modular microphone assembly in accordance with the invention.

FIG. 1 illustrates a handsfree telephone apparatus 10 shown in an exploded view to reveal the position therewithin of a modular microphone assembly 11. Thus, upper and lower telephone housing shells 12 and 13, respectively, are shown separated and the position of the assembly 11 within the closed housing is substantially illustrated. Although not shown in FIG. 1, it will be understood that the assembly 11 is mounted on an inner surface of the shell 12 in operable relation with a plurality of microphone slots 14 and 15 that admit sound waves emanating from a user of the apparatus 10. In this regard, the voice of the user, or an artificial voice for test purposes, may be considered a primary sound source, referred to herein as a first sound source disposed ahead of the assembly 11, which is to say facing the slots 15.

One of the major difficulties normally encountered in designing a handsfree telephone apparatus occurs because of strong acoustical and mechanical coupling between the loudspeaker and microphone of the apparatus 10. The principal problems associated with handsfree telephone apparatus of the prior art are related to the following forms of loudspeaker-microphone coupling:

1. Transmission of acoustic energy from the loudspeaker to the microphone via a path external to the apparatus 10;

2. Transmission of acoustic energy from the loudspeaker to the microphone via a path internal of the apparatus 10; and 3. Mechanical conduction of vibrational energy from the loudspeaker to the microphone through the shells 11 and 12.

Such difficulties are prevalent in the prior art but are substantially overcome by the assembly 11 which creates an environment separate from that of the telephone housing and through which preferred frequency response and directional characteristics for the apparatus 10 are obtained.

Having regard to the embodiment of the assembly 11 shown in FIG. 1, it will be observed that the assembly comprises a receptacle 17 having a closable cavity 18 which is open on one side of the receptacle and is defined by a pair of upstanding side walls 19 and 20, shown spaced apart in substantially parallel relation, a front ramp 21 leading downwardly into the cavity, a back ramp 22 leading upwardly out of the cavity and a central floor 23 which bridges the ramps at the bottom of the cavity and forms a floor thereat.

Contained within the cavity 18, a directional microphone capsule 24 is removably mounted by means of a compliant holder 25 which is adapted to frictionally engage a pair of opposed mounting slots 26 that are each defined by respective pairs of slot guides 27 An exploded view of the assembly 11 is illustrated in order to clearly show a pair of microphone leads 31 which extend from a rearwardly facing surface of the microphone and which pass externally of the cavity 18 through a pair of corresponding apertures 32 that form passageways through the back ramp 22. This and a further embodiment of the assembly 11 will be described in more particular detail in the remarks to follow.

Although not shown in FIG. 1, it will be understood that a speaker in the apparatus 10 is mounted on the inner surface of the shell 12 in registry with a plurality of speaker slots 30. In the description that follows, it will be further understood that test results were developed using a secondary sound source, not shown, which is disposed directly behind the assembly 11 at a reference distance equal to that of the first sound source positioned ahead of the assembly 11.

In a free-field environment, the microphone capsule 24 normally exhibits cardioid type directional characteristics and an essentially flat frequency response within the voice band. Although the free-field directional characteristics of the microphone capsule 24 approximate those desired in the final assembly, an on-axis frequency response thereof does not. A design challenge therefore is to alter the frequency response while maintaining or improving the directional characteristics of the microphone capsule 24 when installed in the assembly 11 within the telephone housing. Difficulties in balancing the microphone parameters, together with the aforedescribed problems associated with the acoustic and mechanical coupling between the loudspeaker and microphone when installed in the housing of the apparatus 10, are substantially overcome through attributes imparted by the assembly 11 and particularly by the precise configuration of the inner surfaces which define the cavity 18, combined with a specific microphone mounting arrangement to be described in the remarks to follow. The present invention offers the advantages of high quality and stability of frequency response, together with predetermined directivity and other beneficial acoustic characteristics which are obtained by integrating the microphone capsule 24 into the apparatus 10 by way of the embodiments hereinbelow described.

The establishment of an isolated microphone system is desirable because it provides protection from the influences of outside factors such as physical forces of vibration and shock as well as electrostatic discharge. The last named influence is perhaps particularly significant because of a dual effect that it presents. Accordingly, not only will the assembly 11 protect a user from the discomfort and annoyance of an electrostatic discharge but will also protect sensitive circuit components in the apparatus 10 from damage through such discharge.

Apart from user benefits, of which only a few examples have been identified, the assembly 11 has the capability of providing consistently good electroacoustic performance that is reproducible under manufacturing conditions. Excellent control of manufacturing is thereby obtained which results in higher manufacturing yields for the entire apparatus 10 that reduce manufacturing costs. Moreover, some of the manufacturing precision and environmental protection requirements may be relaxed for the apparatus 10 as a whole, since many of these considerations are now addressed within the assembly 11.

Figure 2:
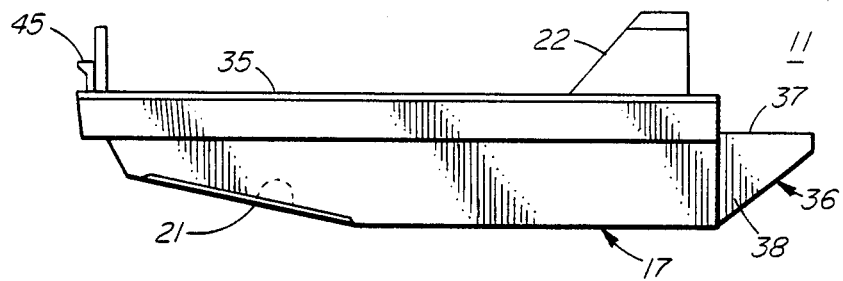
FIG. 2 is a side elevation view of the modular microphone assembly in FIG. 1.

A side elevation of the assembly 11 is illustrated in FIG. 2 from which it will be observed that an edge 35 of the various walls that define the receptacle 17 circumscribes the cavity 18 in a single plane. The planar edge 35 is preferred for its convenience in mounting the receptacle 17 on the aforenoted inner surface, not shown, of the shell 12. In this regard, either a prefabricated resilient seal, or an applied liquid seal that cures into a resilient form, would be applied between the edge 35 and the mounting surface to prevent acoustic energy emanating from the speaker, and transmitted through the interior of the telephone housing, from leaking into the cavity 18. A further description of such seals is not warranted since they are known to those skilled in the art.

Figure 3:
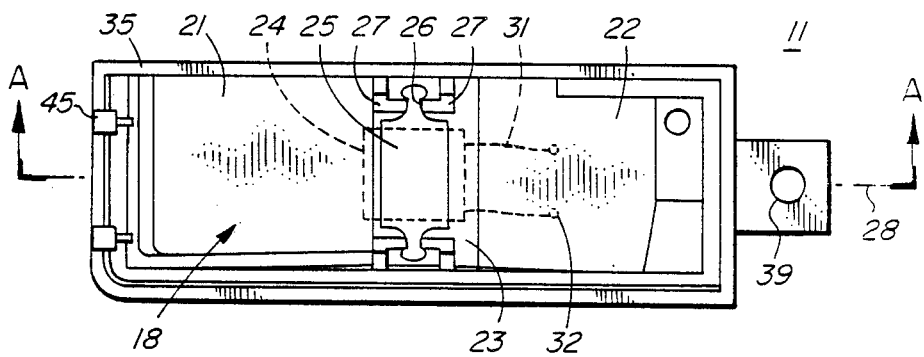
FIG. 3 is a top plan view of FIG. 2.
Figure 4:
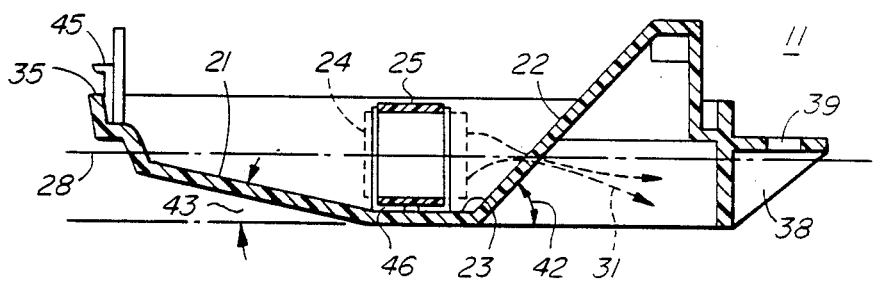
FIG. 4 is a cross-sectional view of FIG. 3 taken along the lines A—A.

A particular form of mounting arrangement for the assembly 11 is shown in FIGS. 2-4 and will be seen to comprise a bracket 36 that is formed integrally with the receptacle 17. The bracket 36 includes a planar mounting surface 37 of a corresponding wall supported by side walls 38. Centrally positioned on the surface 37 is an aperture 39 through which suitable fastener means, such as a sheet metal screw, not shown, may be inserted to securely attach the receptacle 17 at one end thereof to the inner surface of the shell 12. At the other end of the receptacle 17, a pair of upstanding clips 45 are adapted to releasably lock within a corresponding pair of apertures, not shown, in the shell 12.

Crucial to the operation of the invention, as embodied in the assembly 11, is the angular disposition of each ramp 21 and 22 together with the disposition therebetween of the microphone capsule 24. As regards the latter, it will be seen in FIGS. 3 and 4 that the microphone capsule 24 is positioned coaxially about a longitudinal axis 28 that is disposed laterally off-center of the receptacle 17. FIG. 4 reveals that the axis 28 is positioned generally centrally of the receptacle 17 in a vertical direction. The purpose of such positioning along the axis 28 is to assure that sound reflected from the ramp surfaces arrives in an appropriate relationship with direct or non-reflected sound at the microphone capsule 24 so as to impart predetermined acoustic characteristics hereinbelow described.

Two attributes of the microphone capsule 24 location relative the ramps 21 and 22 are important to the operation of the invention. Firstly, the relationship between the front ramp 21 and the microphone capsule 24 is arranged such that some of the sound originating from the first sound source in front of the assembly 11 will be reflected off the ramp 21. This reflected sound will combine at the microphone capsule 24 with the non-reflected sound in such a way that the lowest frequency at which destructive interference occurs, due to phase differences arising from path length differentials, will be above the voice band.

Secondly, the back ramp 22 is positioned with respect to the microphone capsule 24 so as to align the velocity component of the soundfield from the second sound source, originating behind the assembly 11, with the axis 28 of the microphone capsule 24. In addition, the ramp 22 serves to reduce standing waves within the cavity 18. Since the microphone capsule 24 has a null in its free-field response to sounds originating from behind the capsule, this alignment preserves the directional performance of the microphone capsule 24 when installed within the cavity 18 of the assembly 11 interiorly of the apparatus housing.

Destructive interference occurs when the path length differential between the direct and reflected sound impinging on the microphone capsule 24 is equal to N/2 wavelengths, where N is an odd integer. An example of the lowest frequency above the voice band at which destructive interference occurs may be seen in FIG. 14 where a frequency response curve 41 shows a maximum signal output from the microphone capsule 24 occurring near the top of the voice band at a frequency of about 2.5 kHz, followed by a falling response above this frequency. Destructive interference occurs in the assembly 11 near 8 kHz, as indicated by the sharp notches in the frequency response curves of FIG. 14. It will be understood however that other microphones would not necessarily have a notch occurring at the same frequency. Thus the lowest frequency at which destructive interference occurs at the microphone capsule 24 would depend on the particular path length differential of the microphone assembly. Nevertheless, it is important that the path length differential remain less than $\frac{1}{2}$ wavelength within the voice band to prevent the occurrence of destructive interference in this range. Among other factors, the frequency response and directional characteristics of the assembly 11 vary in accordance with the angle of the ramp 21 which, in the assembly 11, has been determined to provide optimum results at an angle 43 occurring in the range of from 11° to 14° with good results achieved at 11.8°. This angle is measured relative the central floor 23.

In the various response curves hereinbelow described, the first sound source was used to develop "frontal incidence" frequency response curves and was intended to represent the assembly 11 response to a user seated in front of the apparatus. The term "frontal incidence" as used herein means horizontal alignment of the first sound source with the axis 28 wherein the source has a vertical displacement to represent a typical relative position with respect to the apparatus 10.

The second sound source was used to develop 180° frequency response curves and was intended to indicate the performance of the assembly 11 in rejecting off-axis sounds.

Referring again to FIG. 14, it will be understood that a curve 44 is a frontal incidence frequency response obtained from the microphone capsule 24 installed in the telephone housing when the ramp 21 is set at an angle of 12°. A similar curve 41 is produced with the ramp set at an angle which is several degrees less Corresponding curves 34 and 33, respectively, show the 180° frequency response characteristics of the microphone capsule 24 when sound waves are directed to the back of the assembly 11 from the second sound source.

A reduction in the front ramp 21 angle causes an increase in the 180° response of the assembly 11, indicating a degradation in directional characteristics, as shown by the curves 34 and 33.

With regard to the ramp 22, the angular position thereof alters the directional characteristic of the assembly 11 by reflectively aligning the velocity component of the second soundfield with the axis 28 of the microphone capsule 24. In the assembly 11, it has been determined that a ramp angle 42 has a preferred angular range of from 40° to 50° with an optimum angle of 48°.

Figure 16:
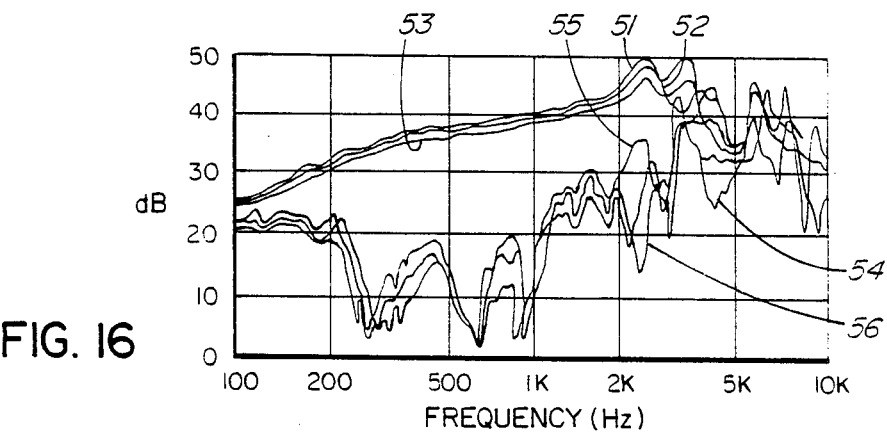

FIG. 16 shows the significance of the angle of the ramp 22 on the frequency response characteristic of the assembly 11. Thus, a curve 51 corresponds to a frontal incidence frequency response with a ramp angle of 90°, a curve 52 to a frontal incidence frequency response with an angle of 60° and a curve 53 to a frontal incidence frequency response with an angle of 40°. In each instance sound waves are directed to the front of the assembly 11 from the first sound source. Corresponding curves 54, 55 and 56, respectively, show the 180° frequency response characteristics of the assembly 11 when the sound waves are directed to the back of the assembly 11 along the axis 28.

Figure 14:
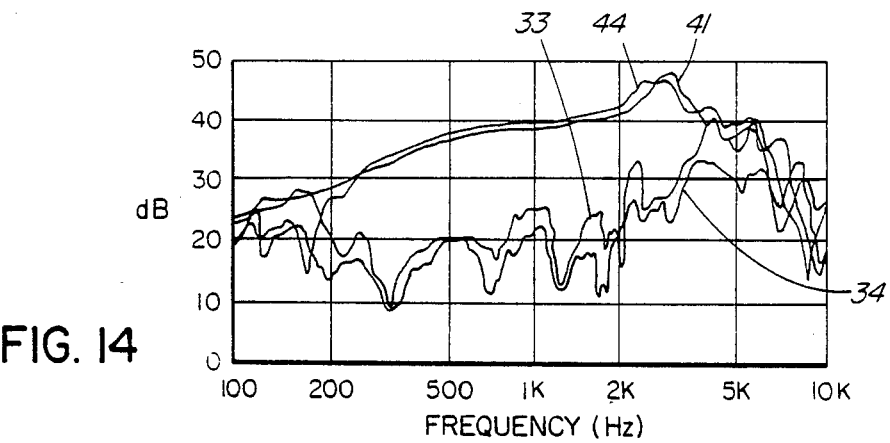
FIGS. 14, 15 and 16 are separate groups of frequency response curves related to the modular microphone assembly of FIG. 5.

As in FIG. 14, the deviation of the ramp 22 from its optimum angle causes an increase in the 180° response of the assembly 11, indicating a degradation in directional characteristics.

FIGS. 3 and 4 show a preferred position for the microphone capsule 24 relative the ramps 21 and 22 as determined by the location of the guides 27 within the cavity 18. As best seen in FIG. 3, the slots 26 are positioned forwardly of center of the floor 23 such that the face of the microphone capsule 24 is in a plane forwardly adjacent the interface of the ramp 21 and the floor 23.

Figure 15:
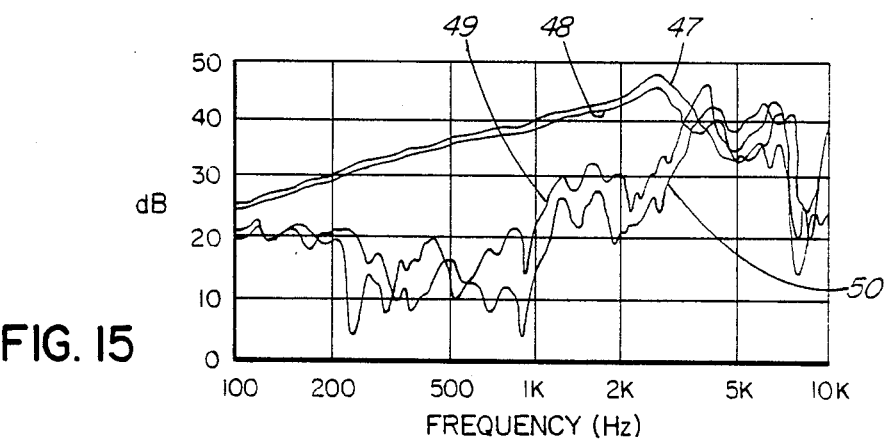

It will also be observed in FIG. 4 that the microphone capsule 24 is positioned vertically by means of its holder 25 which provides a horizontal slot 46 thereunder. The presence of this slot affects the front-to-back ratio of the microphone capsule 24 as illustrated in FIG. 15. Reference thereto shows the frontal incidence frequency response curves 47 and 48 which represent the response of the assembly 11 to the first sound source located in front of the apparatus 10. The curve 47 relates to a frequency response in which the slot 46 is absent, whereas the curve 48 relates to a frequency response in which the slot is 1 mm in height. Corresponding curves 49 and 50 show the respective 180° frequency response curves for the assembly 11 representing the response of the microphone assembly to the second sound source located behind the apparatus 10.

The presence of the slot under the holder 25 significantly reduces the 180° response of the assembly, thereby improving the directional characteristics of the assembly 11.

Figure 8:
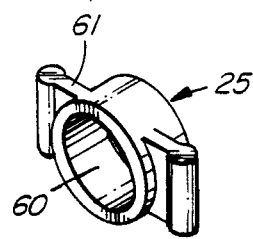
FIG. 8 is a perspective view of a microphone holder shown in FIG. 1.

A perspective view of the holder 25 is illustrated in FIG. 8 wherein it will be understood that the holder is fabricated from a resilient material to provide appropriate vibration isolation. A preferred material having suitable compliance is a visco-elastic polymer with a hardness of less than 30 Durometer Shore A.

A wall thickness of 1 mm provides an adequate elastic restraining force to frictionally retain the microphone capsule 24 within an aperture 60 of the holder 25. The same thickness occurs in a pair of side supports 61 that engage the slots 26 to provide a microphone mounting in a vertical shear mode. This arrangement can provide vibration isolation in excess of 20 dB within the voice band.

Figure 5:
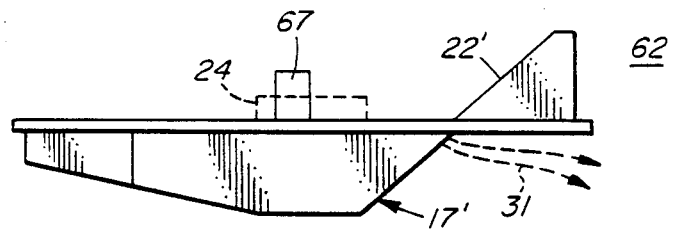
FIG. 5 is a side elevation view of another embodiment of a modular microphone assembly in accordance with the invention.
Figure 7:
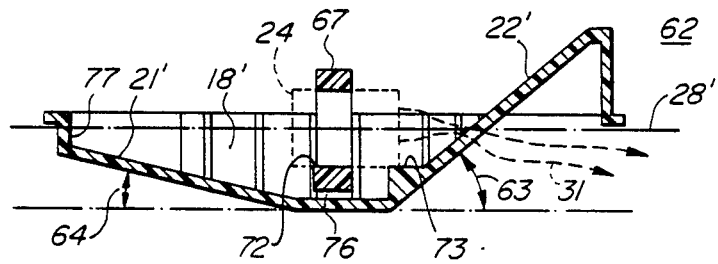
FIG. 7 is a cross-sectional view of FIG. 6 taken along the lines B—B.

Another embodiment similar to the assembly 11 appears in FIG. 5 as a modular microphone assembly 62. A comparison with the assembly 11 reveals a fundamental similarity between both embodiments, notably in the mutual occurrence of front and back ramps 21 and 22, respectively. The function of these ramps is the same in both embodiments, although in the assembly 62 the ramp 22' is set at an angle 63 which is 41°. Similarly, the ramp 21' in FIG. 7 is set at an angle 64 which is 13°.

Figure 6:
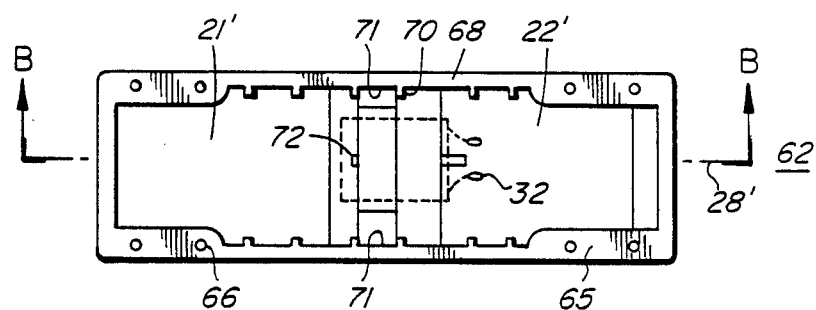
FIG. 6 is a top plan view of FIG. 5.

Another difference occurs in a mounting arrangement for the assembly 62 which is best seen in FIG. 6. Therein, it will be observed that a flange 65 circumscribes the cavity 18' in a plane from which a pair of side walls 68 originate and from which the front ramp 21' originates at the base of a step 77. A plurality of mounting holes 66 perforate the flange 65 as shown and are adapted to fit corresponding projecting studs, not shown, on the inner surface of the shell 12 to which the receptacle 17' is thermally bonded by melting the projecting studs. A gasket similar to that hereinabove described is also required for the assembly 62 to assure a sealed fit with the inner surface of the shell 12.

Positioned coaxially with an axis 28' of the assembly 62, a microphone holder 67 is shown as a slidable gate having a thick wall with side surfaces that are removably held in transverse frictional engagement between the side walls 68. Orthogonal alignment relative the axis 28' is assured by pairs of guides 70, projecting inwardly from the walls 68 to define a pair of slots 71. It will be observed in FIGS. 6 and 7 that the holder 67 includes a forwardly projecting rib 72 which, in combination with the holder 67 and an angular projection 73 protruding from the ramp 22', functions to support the microphone capsule 24'.

Figure 9:
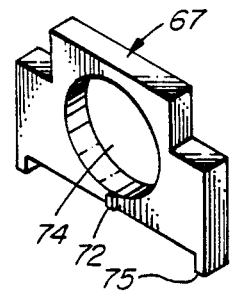
FIG. 9 is a perspective view of a microphone holder shown in FIG. 5.
Figure 10:
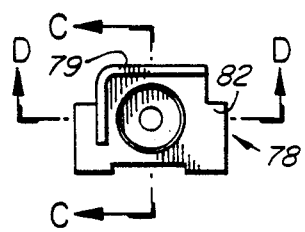
FIG. 10 is a rear elevation view of an insulative microphone holder usable in the assembly of FIG. 1.
Figure 11:
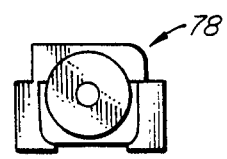
FIG. 11 is a front elevation view of FIG. 10.
Figure 12:
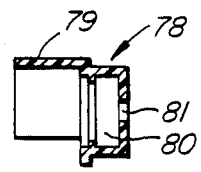
FIG. 12 is a cross-sectional view of FIG. 10 taken along the lines C—C.
Figure 13:
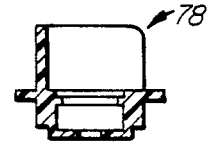
FIG. 13 is a cross-sectional view of FIG. 10 taken along the lines D—D.

Referring next to FIG. 9, a perspective view of the holder 67 shows an aperture 74 within which the microphone capsule 24' is held by an interference fit. Additionally, extending portions 75 serve as spacers to provide a slot 76 (FIG. 7).

It will be observed in FIGS. 5 and 7 that the ramp 22' projects upwardly through the plane of the flange 65. This corresponds to the ramp 22 in FIGS. 2 and 4 which projects similarly through the plane of the edge 35.

A third embodiment of a microphone holder is illustrated in FIGS. 10-13 as a holder 78 having an electrically insulative cover 79. The holder 78 includes a socket 80 adapted to frictionally engage the microphone capsule 24. An aperture 81 provides a passageway through a closed wall of the socket which provides a path for the sound to reach the front of the microphone capsule 24. Similar to the holder 25, a pair of side supports 82 are adapted to slidably engage the slots 26 in order to hold the microphone capsule 24 in position within the cavity 18. Electrostatic discharge protection up to about 18 kV for the user and circuitry of the apparatus 10 is achieved by fabricating the holder 78 from a non-conductive thermoplastic rubber of suitable thickness and by providing an air gap clearance of at least 12 mm between the microphone capsule 24 and the inner surfaces of the apparatus 10.

It will be apparent to those skilled in the art that the aforenoted embodiments may be varied to meet particular specialized requirements without departing from the true spirit and scope of the invention disclosed. For example, whereas the holder 67 is fabricated from a hard plastic, as is the receptacle 17, a preferred plastic being A.B.S., the holder may alternatively be fabricated, with appropriate structural changes, from a much softer visco-elastic material. These embodiments are therefore not to be taken as indicative of the limits of the invention, but rather as exemplary structures thereof, which is defined by the claims appended hereto.

What is claimed is:

1. A modular microphone assembly for a handsfree telephone apparatus including a microphone capsule having a longitudinal axis and predetermined free-field directional and frequency response characteristics within the voice band, comprising:

a receptacle having a cavity open on one side and defined by a pair of upstanding side walls spaced apart in substantially parallel relation, a first reflective surface within the cavity for establishing an acoustic reflective path to the microphone capsule from a first sound source disposed ahead of the assembly, which path is longer than a corresponding direct path from the sound source, and a second reflective surface within the cavity for reflectively aligning with the longitudinal axis the velocity component of a soundfield produced by a second sound source disposed behind the assembly, whereby reflected and direct sound waves from the first sound source effect destructive interference at the microphone capsule at a predetermined lowest frequency occurring above the voice band to prevent loss of high frequency response therewithin, standing waves generated within the cavity are reduced, and the free-field directional characteristics of the microphone capsule are substantially preserved.

2. A microphone assembly as claimed in claim 1, wherein the first reflective surface comprises a front ramp leading downwardly into the cavity and the second reflective surface comprises a back ramp leading upwardly out of the cavity.

3. A microphone assembly as claimed in claim 2, further comprising a central floor bridging the ramps at the bottom of the cavity.

4. A microphone assembly as claimed in claim 3, further comprising means for holding the microphone capsule within the cavity in fixed predetermined relation with the central floor and the front and back ramps.

5. A microphone assembly as claimed in claim 4, further comprising means for attaching the open side of the receptacle against an inner surface of a housing for the handsfree telephone apparatus to provide intimate contact between the inner surface and a peripheral edge circumscribing the open side of the receptacle, thereby closing the open cavity.

6. A microphone assembly as claimed in claim 5, wherein the means for attaching the receptacle comprises a flange circumscribing the cavity in a plane from which the side walls originate and from which the front ramp substantially originates.

7. A microphone assembly as claimed in claim 6, wherein the back ramp projects through the plane of the flange.

8. A microphone assembly as claimed in claim 7, further comprising a step having a microphone capsule supportive uppermost surface projecting into the cavity from the back ramp in planar alignment with a corresponding supporting surface in the microphone capsule holding means.

9. A microphone assembly as claimed in claim 8, further comprising at least one aperture disposed within the back ramp through which a pair of output leads extend out of the cavity.

10. A microphone assembly as claimed in claim 9, wherein the means for closably attaching the receptacle further comprises a resilient seal disposed between the flange and the inner surface of the housing.

11. A microphone assembly as claimed in claim 10, wherein the microphone capsule supporting surface in the microphone holding means includes the side wall of a cylindrical passageway formed therethrough.

12. A microphone assembly as claimed in claim 11, wherein the front ramp originates at the base of a step positioned within the cavity adjacent the flange.

13. A microphone assembly as claimed in claim 12, wherein the microphone capsule holding means comprises a slidable gate with a thick wall having side surfaces removably held in transverse frictional engagement between the side walls above the central floor within the cavity.

14. A microphone assembly as claimed in claim 13, wherein the gate includes a bottom surface having end spacers adapted to retain the bottom surface in predetermined spaced relation with the central floor.

15. A microphone assembly as claimed in claim 14, wherein the angle of the front ramp is in the range of from 11° to 14° relative the central floor.

16. A microphone assembly as claimed in claim 15, wherein the angle of the back ramp is in the range of from 40° to 50° relative the central floor.

17. A microphone assembly as claimed in claim 14, wherein the angles of the front and back ramps relative the central floor are substantially 11.8° and 48°, respectively 18. A microphone assembly as claimed in claim 17, wherein the gate position within the cavity provides an air gap clearance of at least 12 mm between the microphone capsule and the inner surface of the handsfree telephone apparatus.

19. A microphone assembly as claimed in claim 18, wherein the gate further comprises an electrically insulative cover adapted to electrically isolate the microphone capsule.

20. A microphone assembly as claimed in claim 19, wherein the gate is fabricated from a visco-elastic polymer with a hardness of less than 30 Durometer Shore A to effect vibration isolation for the microphone capsule in excess of 20 dB within the voice band.

* * * * *